United States Patent Office 3,420,692
Patented Jan. 7, 1969

3,420,692
PROCESS FOR OBTAINING LOW BAKE PAINT FILMS OF IMPROVED CURE AND ABRASION RESISTANCE
William C. Jeff, North Plainfield, and Thomas Luyster, Jr., Saddle Brook, N.J., assignors to John L. Armitage & Co., Newark, N.J., a corporation of New Jersey
No Drawing. Filed Oct. 22, 1964, Ser. No. 405,837
U.S. Cl. 117—63          5 Claims
Int. Cl. B44d 1/44

ABSTRACT OF THE DISCLOSURE

A method for producing low bake resin-containing paint films of improved cure and abrasion resistance, comprises forming a layer with a composition containing a high molecular weight polyvinyl chloride resin, either a homopolymer or copolymer of vinyl chloride with dibutyl maleate or vinyl acetate, air-drying the resin layer, treating the dried layer with a ketone, and then curing the resin layer at a temperature not substantially in excess of 250° F.

---

This invention relates to a novel process for improving the abrasion resistance of paint films resulting from the low temperature cure of coating compositions containing dispersed, undissolved polyvinyl chloride resin and/or other dispersed resins, particularly resins of high molecular weight.

Surface coating compositions containing polyvinyl chloride resins dispersed in a vehicle consisting essentially of a plasticizer, with or without the addition of volatile solvents, are well known in the art. Such compositions are considered to be organosols if the vehicle contains volatile solvents, whereas they are considered to be plastisols if the volatile solvents are omitted. Such polyvinyl chloride resin-containing organosol and plastisol compositions may conveniently be divided into two distinct classes for purposes of discussion, i.e. "high bake" compositions which are cured at temperatures of about 275 to 375° F. and "low bake" compositions which are cured at about 250° F. or lower temperatures. Undissolved polyvinyl chloride resins may also be incorporated in other types of surface coating compositions, such as baking enamels based upon alkyd-melamine-formaldehyde systems, for example, in order to increase the toughness and chemical resistance of the finished coatings provided by such compositions.

Organosol and plastisol coating compositions of the type referred to above are formulated to provide tough, resilient finished paint films by taking advantage of the fact that polyvinyl chloride resins are soluble in certain plasticizers and solvents at elevated temperatures but are insoluble in these same materials at ambient temperatures. A typical polyvinyl chloride resin paint film of this type having good abrasion resistance is obtained by first dispersing polyvinyl chloride resin in a vehicle mixture consisting essentially of plasticizers and volatile solvents, and/or diluents to form an organosol coating composition containing the resin in undissolved form. The paint obtained in this way is then applied to a surface to be protected and/or decorated by conventional spray, dip or roller coat methods. After application to the surface to be protected the coating is subjected to a curing operation which consists of heating the coated surface to an elevated temperature for a period of time. In the high temperature cure or "high bake" method in which temperatures in the range of about 275 to 375° F. are employed, the dispersed solid particles of polyvinyl chloride resin are actually fused to cause them to dissolve in the vehicle. Prolonged heating during the curing process also causes removal of any volatile components of the vehicle. Subsequent cooling provides a tough, abrasion resistant film coating on the surface of the treated article. The film produced in this way consists of a homogeneous, solid solution of the fused polyvinyl chloride resin in the plasticizer. Plastisol coating compositions and finished paint films derived therefrom are obtained as with the organosols, the only difference being that no volatile solvents are present in the coating composition which must be removed during the curing or baking operation. While high temperature cure coating compositions of this type are useful for many applications due to the toughness and high abrasion resistance of the protective coatings they provide, such "high bake" compositions have certain inherent limitations.

The most serious limitation on the utility of "high bake" polyvinyl chloride resin organosol and plastisol coating compositions is the fact that the high curing temperatures required by these materials are deleterious to many objects and surfaces on which such compositions would otherwise provide desirable coatings. For example, "high bake" coatings can not be applied to articles composed of thermoplastic materials such as polystyrene, for example, since the required curing temperatures would cause the articles to soften and become distorted. Similarly, "high bake" coating compositions can not be used on wood since the required high curing temperatures generally cause the moisture content of the wood to blister the paint film and may also cause the wooden surface or article to warp. Moreover, the high curing temperatures required by the "high bake" compositions described above demand processing equipment which may not be readily available to or economically feasible for use by, many manufacturers. It is apparent, therefore, that a need has existed in the art for a method of rendering dispersed undissolved resin-containing organosol or plastisol coating compositions capable of being cured to tough, abrasion resistant coatings at relatively low temperatures.

The problem of filling this need has been approached in the past by attempting to modify the composition of the coating materials. It has been suggested, for example, that "low bake" coating compositions be provided by using resins which have lower fusing temperatures than those employed in "high bake" coating compositions. Unfortunately, resins which fuse at relatively low temperatures are low molecular weight materials which do not provide the high order of abrasion resistance characteristic of the higher molecular weight, higher fusing resins. In has been apparent, therefore, that it would be desirable to find a method of curing compositions containing high molecular weight resins at low temperatures. It has also been suggested that more active or higher "solvating" plasticizers be employed. While some decrease in the fusion temperature of polyvinyl chloride resins, for example, can be achieved by the use of a plasticizer such as tricresyl phosphate, rather than dioctyl phosphate, for example, this approach generally provides only marginal improvement. Another proposal is to use active polyvinyl chloride solvents of the ester and ketone types, for example, in the coating compositions to aid in initiating the cure of the polyvinyl chloride resin. Although such solvents, when used in limited quantities, do promote low temperature cure, they cause viscosity and storage instability problems. Still another method of reducing the required curing temperatures is to incorporate in the coating compositions modifying resins which polymerize, oxidize or dry by evaporation and thus do not require high curing temperatures. Such materials include polyester resins catalyzed by peroxides which cure by polymerization, alkyd resins which cure by oxidation, and solution-type acrylic resins which dry by evaporation of the solvent in which they are dissolved. While the addition of such resins modifies the films obtained from the polyvinyl chloride resin organosols and plastisols to provide apparent hardness or cure, the modifying resins generally have an adverse effect on the adhesion, impact strength, chemical resistance and abrasion resistance of the finished coatings. In view of the above discussion it will be apparent that a need remains in the art for a method of reducing the curing temperature of organosol, plastisol and other coating compositions containing dispersed, undissolved resins without adversely affecting the viscosity or storage stability of these materials or the abrasion resistance of the finished coatings they provide. Or stated in another way, it would be desirable to provide a method for improving the low temperature cure of polyvinyl chloride resin or other resin-containing organosols, plastisols and other coating compositions to thus improve the abrasion resistance of the paint films obtained from these materials.

The present invention is based on the surprising discovery that the low temperature cure of organosols, plastisols and other coating compositions containing dispersed resin, including relatively high molecular weight resins, in undissolved form, and the abrasion resistance of the cured paint films derived from such compositions, can be markedly improved by treatment of the applied coating composition prior to curing, with solvents or solvent vapors which are true solvents for the particular resin in dispersed form. In the present invention the polyvinyl chloride resin-containing organosols and plastisols and other coating compositions containing dispersed, undissolved resins are first prepared and applied to the surfaces or articles to be protected or decorated by conventional spray, dip or roller coating techniques. The uncured film of the coating composition is then treated according to the invention by the application of a nonaqueous organic treating fluid in the liquid or vapor phase to the coating by any suitable method such as by spraying or dipping, if the treating agent is in liquid form, or by passing the article to be treated through a chamber containing the treating agent in the vapor phase. As noted above, the treating agent selected must be a solvent for the particular undissolved, dispersed resin or resins in the coating composition. In application of the treating agent by a spray technique the spray may be applied under fluid pressure of the treating agent alone or the agent may be admixed with atomizing air or other suitable gas. When the liquid treating agent is to be applied by dipping, it is preferred that the treating bath be heated to about 100–125° F. When the vapor chamber application technique is employed, it is preferred that the vapor be at an elevated temperature. The temperature of the treating agent, applied according to the present invention is not critical, however, and may vary widely within the limits of low temperature cure conditions, i.e. the treating agent should be employed at temperatures not substantially in excess of about 250° F.

Subsequent to the fluid treatment, the resin-containing surface coating on the article is cured at an elevated temperature under "low bake" conditions to produce the desired "low bake" paint films of the present invention which are characterized by markedly improved cure and/or abrasion resistance when compared to films of this type which have not been treated according to the invention. In general, the "low bake" curing conditions which are used in the process of the present invention do not employ temperatures substantially in excess of about 250° F. As is well known in the art lower temperatures require longer curing times whereas higher temperatures provide a satisfactory cure in shorter periods of time. The particular combination of time and temperature selected will depend upon the particular coating compositions employed, the heat resistance of the articles to be coated and other factors well known in the art. Particularly suitable combinations of time and temperature include 160° F. for 1 hour, 200° F. for 30 minutes, and 250° F. for 15 minutes.

Suitable treating agents for use in the present invention are non-aqueous organic fluids which are solvents for the undissolved, dispersed resin in the coating composition to be treated. Most of these treating agents are normally liquid although some are sufficiently volatile to vaporize under the conditions of temperature and pressure in which they are employed in the present invention, i.e. at atmospheric or somewhat elevated pressures and temperatures not substantially in excess of about 250° F. Suitable treating agents include but are not limited to ester solvents such as amyl acetate, aromatic hydrocarbons such as benzene, naptha and toluene, aliphatic hydrocarbons such as the pentanes, hexanes, heptanes and octanes and their higher homologues which are liquid under the conditions of use, and ketones such as cyclohexanone, isophorone, dimethyl formamide, mesityl oxide, methyl isobutyl ketone, methyl ethyl ketone and acetone. The ketones are the preferred treating agents and cyclohexanone is especially preferred.

It has been found that the treatment of the present invention so improves the cure of polyvinyl chloride resin and other undissolved dispersed resin organosols, plastisols and other paint compositions, that the abrasion resistance of the resulting cured films is markedly increased. The use of low fusing polyvinyl chloride resins and other aids to low temperature cure noted above, although desirable, is no longer absolutely necessary. In fact the solvent treatment of the present invention makes possible the use of certain "high bake" polyvinyl chloride resins such as Bakelite QYNV resin available from the Bakelite Division of Union Carbide Corporation. For this reason the method of the present invention also provides improvement in the abrasion resistance of "low bake" compositions by the use of higher molecular weight resins than was possible, heretofore, thus taking advantage of the inherently higher abrasion resistance of such materials.

Any suitable disperson type resin can be used as the undissolved resin in the organosols, plastisols, latices and other paint compositions to which the process of the present invention is applicable. More specifically, suitable resins include cellulose acetate butyrate, polyvinyl butyral and vinyl chloride-acetate copolymers as well as the preferred polyvinyl chloride.

Other film-forming materials in dissolved form may also be employed to bind the particles of the dispersed resin so that during the pre-drying and curing periods no fissure or "mud-cracking" occurs. Types of resins useful for this purpose include the polyacrylates and polymethacrylates, ureaformaldehyde resins, polyester resins, alkyd resins, and melamine-formaldehyde resins, among others. Specific examples of such resins include those sold under the following trade names by the indicated firms: Acryloid B72 and Acryloid B66 (Rohm & Haas); Uformite F240N (Rohm & Haas); Uformite MX61 (Rohm & Haas); alkyds such as Amberlac 292X (Rohm & Haas), Anoplaz 2480, and those sold by General Electric under the trademark, Glyptal, as well as other alkyds such as A.D.M. 2480; and melamine-formaldehyde resins such as Resimen 876 (Monsanto); among others.

In addition to the film-forming resinous materials in dispersed and dissolved form, the compositions to which the present invention is applicable may employ other ingredients such as plasticizers, diluents and pigments. As plasticizers we mention dioctyl phthalate, diisooctyl adipate, tricresyl phosphate, dioctyl sebacate, polymeric type plasticizers such as Rohm & Haas Paraplex G–25 and G–53 or Emery 9765, or other conventional primary vinyl plasticizers; tricresyl phosphate being preferred. As diluents we may employ various liquid aromatic or aliphatic hydrocarbons such as benzene, naptha and toluene and the normally liquid alkanes such as the butanes, pentanes, hexanes, heptanes, octanes and higher homologues of this series, among others. Any of the pigments suitable for incorporation in resinous films may be employed including, for example, titanium dioxide, aluminum pigment, clays and silicates among others. As will be appreciated by those skilled in the art, other ingredients may be employed as adjuvants.

It will be further appreciated by those skilled in the art that the precise formulas employed in the surface coating compositions to which the present invention applies will vary depending upon a number of factors including the particular ingredients employed, and the conditions to which the materials are subjected, for example, thickness of resinous layer, temperature and time of drying and cure, molecular size of the resins, etc. Hence although the precise formula in each case is a delicately balanced one, the number of variables entering into the situation is such that it would serve no useful purpose to specify permissive and preferred amounts and treatment conditions in general.

It is believed, however, that anyone skilled in the art can, without the exercise of any invention, utilize the teachings herein in order to select or compound surface coating compositions to which the present inevntion would be applicable with beneficial results.

The invention will now be described in greater detail in conjunction with the following specific examples, which are given by way of illustration only and are not intended to limit the scope of the invention.

EXAMPLE I

A white polyvinyl chloride-acrylic-phosphate plasticizer type "low cure" organosol coating composition contains the following ingredients:

| | Parts by weight |
|---|---|
| Polyvinyl chloride resin [1] | 29.5 |
| Tricresyl phosphate | 8.4 |
| Polymeric plasticizer [2] | 4.0 |
| Acrylic resin, 40% solution in toluol [3] | 24.3 |
| Barium-zinc stabilizer [4] | 2.3 |
| Titanium dioxide | 6.0 |
| Toluol | 25.5 |
| | 100.0 |

[1] Bakelite QYNV: 99% polyvinyl chloride, M.W. 100,000, sp. gr. 1.4, sp. vis. 0.57, apparent density of powdered resin 18 lbs./ft.³
[2] Emery 9765 or Rohm & Haas Paraplex G–53: M.W. 3380, GH color 8, sp. gr. 1.1, vis. 60 p.s., $n_D^{20}$ 1.467, acid No. 2 max., sap. No. 531.
[3] Rohm & Haas Acryloid B66: ester copolymer butyl and methyl methacrylic acids, sp. gr. 0.97, vis. 250–335 cps, 8.1 lbs./gal.
[4] Advance V–12.

The pigment titanium dioxide, is dispersed in the polymeric plasticizer by grinding in a three roller mill to a North Standard Hegman Grind Gauge reading of 6. The resulting pigment-plasticizer mixture is incorporated into the balance of the liquid materials listed above and then the polyvinyl chloride resin is incorporated by high speed agitation. Approximately 30 minutes mixing is required to produce a homogeneous mixture free of lumps. The mixture is then filtered through a 100 mesh screen to obtain the finished low cure polyvinyl chloride organosol coating composition which has the following properties.

| | |
|---|---|
| Wt./gallon | lbs__ 9.0–9.2 |
| Viscosity | cps__ 1,500 |
| Solids | percent__ 58–60 |

The above-described organosol coating composition is prepared for use by thinning to 25 seconds No. 4 Ford Cup viscosity and then spraying onto a steel panel to a wet film thickness of 8 mils. The painted panel is then air flash dried for about 10 minutes. The coated panel is then treated according to the invention by spraying it with a fine mist of cyclohexanone covering the surface of the panel by the use of a standard suction feed spray gun operating at about 20 lbs. air pressure. The treated panel is air dried for about 5 minutes and then backed under low temperature cure conditions, specifically, about 30 minutes at about 200° F. The resulting "low bake" polyvinyl chloride resin paint film on the steel panel is then tested for abrasion resistance using CS 10 wheels, a 1,000 gram load, and 1,000 cycles of a Taber Abrasion Tester (Taber Instrument Co., North Tonawanda, N.Y.). A polyvinyl chloride paint film which is obtained on another steel panel by following the above procedure in every detail, except for omission of the treatment with cyclohexanone, is tested exactly as above as a control. The comparative abrasion resistance of the two panels are as follows:

| | Mg. loss |
|---|---|
| Cyclohexanone treated panel | 40 |
| Control panel | 60 |

It may be seen, therefore, that when the two panels are tested by the standard abrasion resistance test described above it is found that the control panel loses 20 mg. more paint film than the panel treated according to the invention. Thus the method of the invention increases the abrasion resistance of the "low bake" polyvinyl chloride paint film by 33⅓%. It is apparent, therefore, that the present invention makes possible for the first time "low bake" polyvinyl chloride paint films having the tough, resilient surface typical of "high bake" polyvinyl chloride films.

EXAMPLE II

A white, polyvinyl chloride-oxidizing alkyd-phosphate plasticizer type "low bake" organosol coating composition contains the following ingredients:

| | Parts by weight |
|---|---|
| Polyvinyl chloride resin [1] | 27.0 |
| Tricresyl phosphate | 3.5 |
| Acrylic resin, 40% solution in toluol [2] | 22.5 |
| Barium-zinc stabilizer [3] | 0.6 |
| Cobalt naphthenate drier (6%) | 0.1 |
| Titanium dioxide | 6.0 |
| Akyd resin [4] | 19.2 |
| Toluol | 21.1 |
| | 100.0 |

[1] Bakelite QYNV.
[2] Rohm & Haas Acryloid B66.
[3] Advance Nuodex V–12: organometallic barium zinc phosphate, sp. gr. 0.90–0.93.
[4] Rohm & Haas Amberlac 292X: alkyd polyester type castor oil based resin in xylol, solids 47–49%, acid No. 13 max. GH color 4, weight 7.9 lbs./gal.

The pigment, titanium dioxide, is dispersed in the alkyd resin by grinding in a three roller mill to a North Standard Hegman Grind Gauge reading of 6. The resulting pigment-alkyd resin color paste is then added to the balance of the liquid ingredients listed above and then the polyvinyl chloride resin is added under high speed agitation which is continued until the mixture is homogeneous and free of lumps. The mixture is then filtered through a 100 mesh screen to obtain the finished low cure polyvinyl chloride organosol paint which has the following properties.

| | |
|---|---|
| Wt./gallon | lbs__ 9.0–9.2 |
| Viscosity | cps__ 2,000 |
| Solids | percent__ 50–53 |

The organosol paint formulation of this example is prepared for use by thinning to 25 seconds No. 4 Ford Cup viscosity and then sprayed onto a steel panel to a wet film thickness of 8 mils. The painted panel is then air flash dried for about 10 minutes. The panel is then treated according to the invention by immersing it in a bath of cyclohexanone at 120° F. for about 5 seconds. The panel is then air dried for about 5 minutes and the paint film is cured under "low bake" conditions at about 160° F. for about one hour. A control panel is obtained with the identical procedure except that the step of immersion in the cyclohexanone bath is omitted. When the cyclohexanone-treated panel and control panel are tested for abrasion resistance using CS 10 wheels, 1,000 gram load, and 1,000 cycles on a Taber Abrasion Tester it is found that the control panel shows a loss of paint film of 100 mg. whereas the panel treated according to the invention shows a loss of paint film of only 40 mg. It is apparent therefore, that the process of the present invention improves the abrasion resistance of the subject paint film by 150% to provide a painted panel having 2½ times the abrasion resistance of the untreated panel. Moreover, the pre-treated film of the present invention which is later cured under "low bake" conditions closely resembles a typical "high bake" 350 F. polyvinyl chloride-containing organosol paint film in toughness, resiliency and abrasion resistance.

As noted above, the principle of the present invention, by which paint films containing undissolved polyvinyl chloride resin are treated with certain agents before curing under "low bake" conditions, is applicable to systems other than the organosol type dispersions described in the foregoing examples as is illustrated by Example III below.

EXAMPLE III

A common semi-gloss baking enamel, based upon a conventional alkyd-melamine formaldehyde resin formulation containing a small amount of dispersed polyvinyl chloride resin to fortify the film with respect to resistance to chemicals, is further improved as to touchness and abrasion resistance by the method of the present invention. Such a formulation contains the following ingredients:

| | Parts by weight |
|---|---|
| Polyvinyl chloride resin | 20.0 |
| Castor oil alkyd resin 50% in xylol [1] | 30.0 |
| Titanium dioxide | 15.0 |
| Melamine formaldehyde resin [2] | 10.0 |
| Talc [3] | 5.0 |
| Xylol | 20.0 |
| | 100.0 |

[1] Anoplaz 2480: Dehydrated castor oil alkyd resin, sp. gr. resin solids 1.15, phthalic anhydride 40%, oil acids content 35%, acid No. of solution 4–5.
[2] Monsanto Resimen 876; Solids 50% in 80:20 xylol-butanol, viscosity G–M, GH color 50, Solution Acid No. less than 1, weight 8.4 lbs./gal.
[3] W.C.D. Lomicron 399 Talc: magnesium silicate, sp. gr. 2.71, average particle size 7 microns.

The above semi-gloss white bake enamel is applied to surfaces to be protected and/or decorated on two separate panels by conventional means. One of the panels is treated with cyclohexanone according to either of the procedures used in Examples I and II above for this purpose and the other panel is prepared in the same way except that the cyclohexanone treatment is omitted. The two panels are then cured under "low bake" conditions. It is found that the panel treated according to the invention has markedly superior abrasion resistance as compared to the control panel. Specifically, the cyclohexanone treated panel when tested for abrasion resistance by the method described above in Examples I and II shows a loss of paint film of only 80 mg., whereas the untreated control panel shows a loss of 120 mg. under identical conditions. Therefore, the method of the invention increases the abrasion resistance of this polyvinyl chloride resin-containing paint film by 50%. It is also notable that the untreated control panel obtained as above is completely covered with fissures commonly known in the art as "mud cracks" whereas the treated panel is completely free of this surface imperfection.

EXAMPLE IV

An unpigmented cellulose acetate butyrate organosol coating composition contains the following ingredients:

| | Parts by weight |
|---|---|
| Cellulose acetate butyrate resin [1] | 20.0 |
| 50% linseed phthalic alkyd | 70.0 |
| 6% cobalt naphthenate | 1.0 |
| 24% lead naphthenate | 1.0 |
| Mineral spirits | 8.0 |
| | 100.0 |

[1] Tennessee Eastman Co. ½ Sec Butyrate.

The cellulose acetate butyrate has a specific gravity of 1.2, acetyl content of 13.0%, butyryl content of 37.0%, a refractive index of 1.48, a melting range of 140 to 170° C. and a molecular weight of 30,000. This resin is screened through an ASTM 60 mesh sieve and only resin passing through the sieve is used. The screened resin is incorporated with the other ingredients by simple hand mixing until the mass is homogeneous. The dispersant vehicle is a medium oil linseed phthalic alkyd resin soluble in mineral spirits which has a Gardner-Holdt viscosity of X–Y, a Gardner color of 9 maximum, a solids content of 50% in mineral spirits, an acid No. (solid resin) of 6 to 10 and weighs 7.7 lbs./gallon.

The resulting organosol containing dispersed, undissolved cellulose acetate butyrate resin is thinned to a spray viscosity by the addition of about 10% of VMP naphtha by volume. The coating composition obtained in this way is sprayed onto a pair of steel panels and air flash dried for less than 3 minutes.

One of the panels is then subjected to solvent treatment according to the invention by dipping in a 2-butoxyethanol (butyl Cellosolve) bath at a temperature of 100° F. The two panels are then baked for 3 hours at 150° F. i.e. the panels are cured under "low bake" conditions. When treated and untreated panels obtained as above are compared, the untreated control panel will exhibit a rough "sugary" surface due to the presence of undissolved resin. The panel solvent treated according to the invention, on the other hand, will exhibit a glossy surface. The slightly different appearance of the treated panel is only incidental, the object of the invention not being merely to produce a glossy surface but to improve the abrasion resistance of "low bake" paint films by using higher molecular weight dispersed resins than was possible heretofore.

EXAMPLE V

An unpigmented polyvinyl butyral organosol coating composition is prepared according to the procedure of Example IV above by substituting for the cellulose acetate butyrate resin, a polyvinyl butyral resin having a molecular weight of 64,000, a butyral content as percent polyvinyl butyral of 80, an acetate content as percent polyvinyl acetate of 2.5 maximum, a hydroxyl content as percent polyvinyl alcohol of 17.5 to 21.0, a specific gravity of 1.1 and a viscosity of 400 centipoises in a 10% solution in 95% ethyl alcohol. A commercial equivalent of this material is available from Shawnigan Resin Corp. as Butuar B–73. The resulting organosol is thinned as in Example IV and sprayed onto a pair of steel panels and air flash dried as before.

One of the coated steel panels is then subjected to solvent treatment according to the invention by hanging the panel in a chamber filled with butanol vapors at 220° F. for 3 hours. When the treated and untreated panels obtained in this way are compared, the untreated control panel will exhibit a rough surface due to the presence of undissolved resin whereas the treated panel will exhibit a glossy surface showing that the solvent treatment has put the dispersed resin in solution or partial solution in situ on the surface of the panel.

EXAMPLE VI

An unpigmented vinyl chloride-acetate copolymer organosol coating composition is prepared according to the procedure of Example IV by substituting for the cellulose acetate butyrate resin a vinyl chloride-acetate copolymer containing about 90% vinyl chloride and about 10% vinyl acetate, having a specific gravity of 1.36 and an intrinsic viscosity of 0.79 measured in cyclohexanone at 20° F. A commercial equivalent of this material is available as Bakelite VYNS. The resulting organosol is thinned as in Example IV and sprayed onto a pair of steel panels and air flash dried as described above.

One of the coated steel panels is then treated according to the invention by spraying it with dimethyl formamid.

The treated and untreated panels are then baked at 150° F. for 3 hours. When the cured treated and untreated panels are compared it will be seen that the dispersed resin in the treated panel is partially or completely dissolved as shown by the glossy surface of the panel whereas the dispersed resin in the untreated panel is not thus affected by the curing conditions and the surface of the panel has the rough sugary appearance characteristic of the untreated panels of Examples IV and V. It is apparent, therefore, that the dimethyl formamide solvent treatment improved the cure of the treated panel under "low bake" conditions.

Examples IV, V, and VI demonstrate that high molecular weight resins, which would produce undesirably high viscosities if used in true solution, can be dispersed, if put in suitable form, to produce organosols which when treated according to the present invention can be satisfactorily cured to give highly abrasive resistant coatings without the necessity of using high baking temperatures to fuse the resins.

EXAMPLE VII

As an example of an aqueous dispersion or emulsion-type resin Rohm & Haas AC-34 may be employed. This material is a non-ionic aqueous emulsion of a thermoplastic acrylic polymer 46 to 47% solids, pH 9.4 to 9.9 and weighing 8.8 lbs./gal. The maximum clear dry film hardness is 0.8 Tukon, Unmodified AC-34 resin is sprayed on a pair of steel panels and air dried for 5 minutes. One of the panels is then sprayed with butyl Cellosolve at a temperature of 200° F. The treated and untreated panels are then cured at 150° F. for 3 hours. When the cured coatings on the two panels are compared the treated film will be seen to have a glossier and smoother appearance than the untreated film thus revealing in situ solution or partial solution of the dispersed resin on the treated panel during the low temperature cure.

Although steel panels are mentioned in all of above examples, all of the coating compositions described above are cured at temperatures below 250° F., and most of them at temperatures of only 150° F. Therefore, such coating compositions can be applied and satisfactorily cured on wood, thermoplastic or other surfaces which are capable of withstanding "low bake" conditions but which would be destroyed under "high bake" conditions.

Any dispersion type resin can be employed in a suitable coating composition to achieve improved cure and abrasion resistance in a "low bake" paint films if the coated composition is treated with an organic fluid solvent for the specific resin according to the present invention.

Other soluble resins useful in addition to the dispersed, undissolved resins in the organosols of the invention include: Acryloid B-72, an ester copolymer of ethyl methacrylic and methyl methacrylic acids in toluol, 40% solids, specific gravity 0.97, viscosity 480 to 640 cps. and weighing 8.1 lbs./gal.; Uformite F-240N a urea-formaldehyde resin containing 60% solids in high flash naphtha, specific gravity 1.02, acid number of solids 3 to 8 and Gardner-Holdt viscosity R-Q; Uformite MX-61, a triazine for formaldehyde resin, 60% solids in 50—50 xylol-butanol, specific gravity 1.04, acid number of solids 0 to 1.0, Gardner-Holdt viscosity G-K; Paraplex G-25, a sebacic acid type polyester plasticizer, molecular weight 8000, Gardner-Holdt color 11 maximum at 50% solution, specific gravity 1.06, viscosity 1700 poises, refractive index 1.470, acid No. 2.0 maximum and saponification No. 460.

It may be seen from the above that the solvent treatment of surface coatings based upon organosol, plastisol, latex, emulsion and other vehicle systems containing dispersed, undissolved resins according to the present invention provides "low bake" resin-paint films having improved cure and abrasion resistance.

The foregoing illustrates the practice of this invention which, however, is not to be limited thereby but is to be construed as broadly as permissable in view of the prior art and limited solely by the appended claims.

We claim:

1. A process for obtaining low bake paint films of improved cure and abrasion resistance which comprises forming a layer with a composition containing at least one high molecular weight resin in unsolvated dispersed form selected from the group consisting of a vinyl chloride homopolymer, a copolymer of 95 to 97% vinyl chloride and 5 to 3% dibutyl maleate, and a copolymer of 90 to 98% vinyl chloride and 10 to 2% vinyl acetate, by weight, said resins having a weight average molecular weight in the approximate range 100,000 to 500,000 based upon inherent viscosity as measured by ASTM D-1243-58T Method A, said composition containing a plasticizer for polyvinyl chloride in an amount not exceeding about 42 parts of plasticizer per 100 parts of resin by weight, air-drying said layer to remove the major portion of volatile materials present therein, coating said dried layer with a ketone volatile in the range from about 130° F. to about 425° F. and which is a solvent for the resin in said layer, and thereafter curing said coated layer at an elevated temperature not substantially in excess of 250° F.

2. A process according to claim 1, wherein the composition contains a pigment.

3. A process according to claim 1, wherein the ketone is selected from the group consisting of cyclohexanone, isophorone, dimethyl formamide, mesityl oxide, methyl isobutyl ketone, methyl ethyl ketone and acetone.

4. A process according to claim 3, wherein the ketone is cyclohexanone.

5. A process according to claim 3, wherein the ketone is applied to said dried layer in the vapor phase at an elevated temperature.

References Cited

UNITED STATES PATENTS

| 2,431,078 | 11/1947 | Powell et al. | 117—63 |
| 2,575,046 | 11/1951 | Chavannes et al. | 117—63 |
| 2,715,587 | 8/1955 | Armitage et al. | 117—63 |

MURRAY KATZ, *Primary Examiner.*

U.S. Cl. X.R.

117—119.6, 132